United States Patent
Klein et al.

(10) Patent No.: US 6,539,414 B1
(45) Date of Patent: Mar. 25, 2003

(54) INCORPORATING COLLATERAL AND CONCURRENT ACTIVITY IN A DATA PROCESSING TRANSACTION

(75) Inventors: Johannes Klein, San Francisco, CA (US); Albert C. Gondi, Santa Clara, CA (US); Sitaram V. Lanka, Mountain View, CA (US); William J. Carley, San Jose, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/126,634

(22) Filed: Jul. 30, 1998

(51) Int. Cl.$^7$ ................................................. G06F 9/00
(52) U.S. Cl. ..................................................... 709/101
(58) Field of Search ................................ 709/101, 201, 709/328, 104, 106; 707/8, 10

(56) References Cited

U.S. PATENT DOCUMENTS 5,987,463 A * 11/1999 Draaijer et al. ............... 707/10

OTHER PUBLICATIONS

P. Muth, et al, "Atomic Commitment for Integrated Database Systems", IEEE, 1991, pp. 296–304.*
Gray et al., "Transaction Processing: Concepts and Techniques" (1993), Morgan Kaplan Publishers, ISBN 1–55860–190–2: TOC and Sections 4.8, 5.3, 6.2, 10.2, 10.4, 11.1 and 11.2.

* cited by examiner

Primary Examiner—Sue Lao
(74) Attorney, Agent, or Firm—Oppenheimer Wolff & Donnelly, LLP; Leah Sherry, Esq.

(57) ABSTRACT

Incorporation of a collateral process as a participant in a transaction is made possible by a method and system in accordance with the present invention. Typically, after the transaction is initiated, the collateral process is called and then is registered as a participant, in the transaction. A prepare signal is sent to each registered collateral process when end stage of the transaction is reached. Then, a ready signal is received from the collateral process if the collateral process is completed successfully; and an abort signal is received from the collateral process if the collateral process does not complete successfully or a violation is detected. If a ready signal is received, a commit record is written to a log, and a commit signal is sent to each registered collateral process. In response to the commit signal, a forgotten signal is received from each registered collateral process.

11 Claims, 2 Drawing Sheets

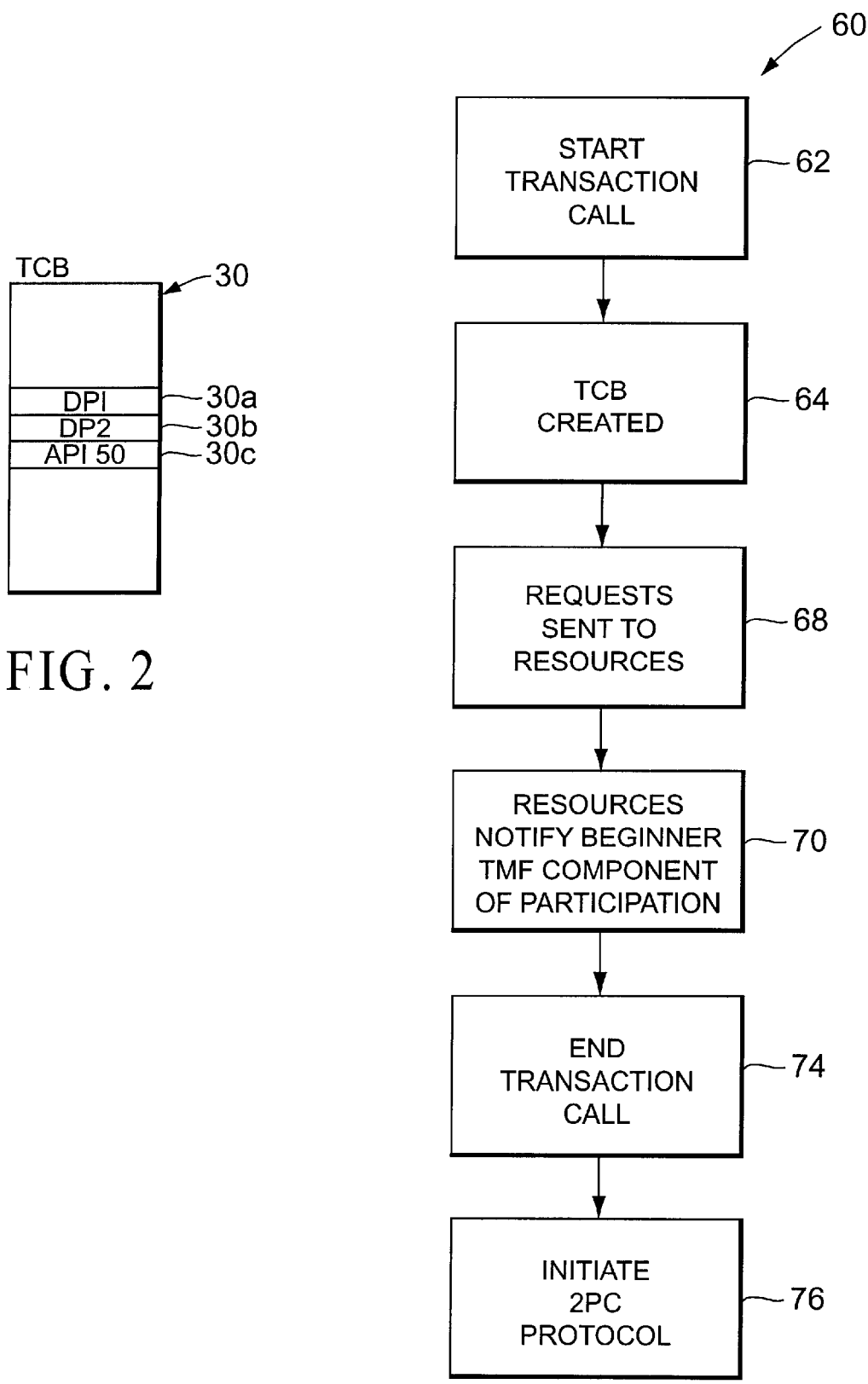

INCORPORATING COLLATERAL AND CONCURRENT ACTIVITY IN A DATA PROCESSING TRANSACTION

BACKGROUND OF THE INVENTION

The invention relates generally to a transaction processing system, and more particularly to incorporating collateral activity as a participant in a transaction.

A transaction most often is defined as an explicitly delimited operation, or set of related operations, that change or otherwise modify the content of an information collection (e.g., database) from one consistent state to another. Changes are treated as a single unit in that all changes of a transaction are formed and made permanent (the transaction is "committed") or none of the changes are made permanent (the transaction is "aborted"). If a failure occurs during the execution of a transaction, resulting in the transaction being aborted, whatever partial changes were made to the collection can be undone so that the information collection remains in a consistent state.

Often, it is desired that certain activity be associated with a transaction, but performed after the transaction is completed. For example, an application executing a transaction may desire to verify that the transaction is consistent under certain policy guidelines or rules. Consider a transaction processing system structured to maintain a company database that includes information respecting the company's employees, including payroll. Consider a change to the payroll information for a particular employee such as implementing a raise in the employee's salary. Then, the payroll information change is checked or verified to see that it was made pursuant to company guidelines. In the past that payroll change would then be made and committed (made persistent) before the change (raise in salary) is checked. If such guidelines were exceeded, the change is typically undone.

While effective, calling upon such collateral activity after the transaction has been completed can be time-consuming, particularly if the collateral activity or check requires that the preceding change be withdrawn.

Accordingly, there is a need to incorporate collateral activity within the bounds of a data processing transaction before the transaction completed and make persistent.

SUMMARY OF THE INVENTION

The present invention provides, in the context of a transaction, a resource that performs collateral activity (i.e., activity not directly related to a change of an information collection), allowing it for example to participate in the transaction as a "voting" member. Thus, the collateral activity can participate in the decision of whether or not the change should be made.

Broadly, according to the present invention, when an application process initiates a transaction, it can also employ a collateral process to perform work that is not directly related to a change of state in the information collection (hereinafter "database") but is able to participate in that transaction. The invention is employed in the context of transaction management provided by a transaction monitor facility (TMF) operable to protect the integrity of user data maintained in the database, particularly when the state of that database is changed. According to the invention, the collateral process may be called by an application as part of a transaction. When called, the collateral process can request participation in the transaction as a voting member by making a call to TMF_Export, an application programming interface (API). The call will provide the called API with the identities of the calling process and the transaction in which participation is desired. Among the tasks performed by the API is one that functions to "register" a calling process with an identified transaction. A registered process allows it to become a participant in the transaction and can vote in the two-phase commit protocol performed when the end transaction aspect is reached.

Typically, the transaction is monitored and tracked by a TMF, and preferably concludes using a two-phase commit protocol. Typically also, the TMF initiates the conclusion of a transaction by sending a "Prepare" signal. In reply, registered participants of the transaction return "Ready" signals, indicating that they made the necessary preparations to make the change persistent. When the collateral process receives the "Prepare" signal, it will perform its collateral activity. When that collateral activity is complete, the collateral process will either return a "Ready" signal, indicating that the collateral activity completed successfully, or returned an "Abort" signal, indicating that the collateral activity did not complete successfully or that the change in the database being made by the transaction violated some policy or guideline.

A conventional transaction control block (TCB) data structure is formed when the transaction is initiated. The TCB data structure is basically a public container, with some private fields, that provides a description of the associated transaction. The TCB data structure includes the identity of each participant in the transaction, thereby identifying the resources that will receive the "Prepare" signal when the end transaction stage is reached. Therefore, in addition to those participants of which the TMF normally has cognizance, i.e., those whose operation will result in the change of the database, a process may join as a participant by calling the TMF_Export function. That function will, in turn, notify TMF that the calling process desires participation, and TMF will write the identity of the calling process to the TCB data structure of the associated transaction.

A number of advantages are achieved by the present invention. By including collateral activity in the context of the transaction, that collateral activity can be performed in parallel and concluded with the transaction to improve efficiency and linearity of operation.

In addition, should the collateral activity so indicate, undoing the transaction at the behest of the collateral activity can be performed at a stage before the change of state of the database is made persistent.

These and other aspects and advantages of the invention will become apparent to those skilled in the art upon a reading of the following detailed description of the invention, which should be taken in conjunction with the accompanying drawings.

BRIEF DESCRIPTION OF THE DRAWINGS

FIG. 2 illustrates a transaction control block (TCB) data structure, including the identity of participating resources in the associated transaction; and FIG. 3 is a flow diagram illustrating the steps used to employ the present invention.

DETAILED DESCRIPTION OF THE PREFERRED EMBODIMENT

Figure 1:
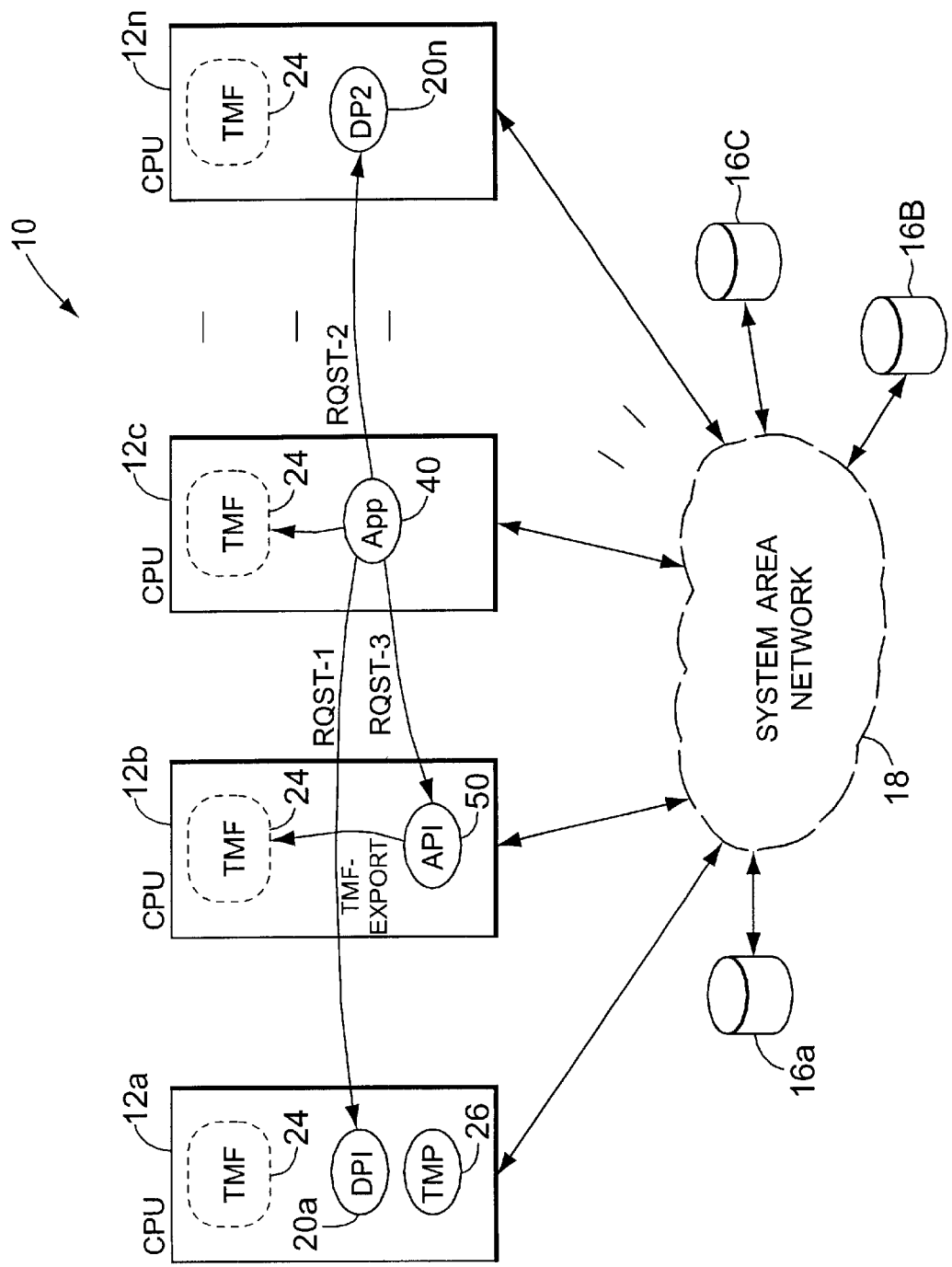
FIG. 1 illustrates a multiple process transaction processing system for employing the present invention.

Turning now to the figures, and for the moment specifically FIG. 1, there is illustrated a transaction processing system, designated with the reference numeral 10. As FIG. 1 shows, the transaction processing system 10 is formed from a number of individual central processing units (CPUs) 12, 12a, 12b, . . . 12n)), and a storage system (e.g. disk unit) 16 (16a, 16b, 16c) interconnected by a system area network (SAN) 18 for communicating data therebetween. Although the transaction processing system 10 is illustrated in the form of a multiprocessor architecture, the present invention need not employ multiple processors; rather, the invention can be used on a single processor unit.

If a multiprocessor architecture is used, preferably the transaction processing system 10 will have an architecture along the lines of that disclosed in U.S. Pat. No. 5,751,932, incorporated herein by reference to the extent necessary. As such, each of the CPUs 12 will have direct access, through the SAN 18, to any of the disk storage units 16. However, only that CPU 12 having the appropriate driver process for the particular disk storage unit 16 actually has effective access. Thus, for example, the CPU 12a has resident a disk process (DP) 20a for controlling data transfers between the CPU 12a and, for example, the disk storage unit 16A. Similarly, a disk process 20n, resident on the CPU 12n, may provide the control for data transfers between the CPU 12n and the disk storage unit 16b. Of course, other processes may control other resources (e.g., disk storage unit 16c), but are not shown in order that the figure not be unduly complicated.

For transaction processing, the transaction processing system 10 will include a distributed transaction monitor facility (TMF) having a TMF component 24 resident on each CPU 12. In addition, a transaction monitor process (TMP) 26 will be resident on one of the CPUs 12—here, CPU 12a. The TMF components 24 operate to coordinate and track a transaction. At the conclusion of a transaction, the TMP 26 is called upon to write a record of the change to, for example, an audit log. When a transaction is started on one CPU 12, the CPU is designated the "beginner" CPU, and the TMF component 24 on the beginner CPU is herein referred to as the "beginner" TMF component. If the transaction involves a process resident on another CPU 12, that other process (as do the CPU 12 and its associated TMF component 24) becomes a "participant" of the transaction, and subordinate to the beginner TMF component 24 on the beginner CPU 12.

Transactions are initiated by applications desiring to change the state of the information collection or database maintained by the transaction processing system 10. Typically, that state is in persistent form on the secondary storage utilized by the system, such as the disk storage unit 16. An application will begin a transaction with a "Start Transaction" call to the local TMF component 24, providing information necessary for the TMF component to monitor and track the transaction. When that call is received by the TMF component 24, the TMF component (now, the beginner TMF component) will form a transaction control block (TCB) data structure 30 which will contain the information needed by the beginner TMF component 24 for monitoring and tracking the transaction, including the identity or identities of any resource managers to be used in the transaction. This is used, depending upon the protocol used to make any changes of state of the database persistent, to coordinate the end operation. Preferably, the transaction will conclude employing the conventional two-phase commit (2PC) protocol. Briefly, according to this protocol, a transaction concludes two phases: A first phase in which the beginner TMF component 24 sends a "Prepare" Signal to all participating subordinates (e.g., processes) indicating that it is time for them to prepare to make any changes to the state of the database in which they are involved permanent. If the subordinate is able to ready itself, it will respond (through its associated component 24) with a "Ready" signal. When Ready signals are received from all participating subordinates, the beginner TMF component 24 will then "commit" the transaction by first requesting the TMP 26 to write a commit record to an audit log, and then by sending a "Commit" signals to the participating subordinates. The subordinates will then conclude their work, reply with a "Forgotten" signal, indicating that everything went properly.

There are a number of variations in this protocol, for example, presumed abort or presumed nothing, as is conventional, but these variations are not relevant to the understanding of the present invention.

As an example, and referring to the flow diagram 60 of FIG. 3 assume that an application 40 (FIG. 1) initiates a transaction from CPU 12c. Assume further that the application 40 will require the services of the CPUs 12a, and 12n, i.e., disk storage units 16a, 16b managed by the disk processes 20a and 20n, respectively. In step 62, the application 40 will first issue a "Start Transaction" call to the local TMF component 24, making it the beginner TMF component for the transaction, and providing the TMF component with information as to the transaction. The beginner TMF component 24, at step 64, will prepare the TCB data structure 30 for that transaction.

The application 40 will, at step 68, then send request messages (RQST-1, RQST-2) to the processes to be used (disk processes 20a, 20n). When the enlisted process (e.g., disk process 20a) receives the request (RSQT-1), which contains information identifying the transaction, it will inform its local TMF component 24, who in turn notifies the coordinator beginner TMF component on CPU 12b, which writes that information to the TCB data structure 30. Thus, the requests sent to the disk processes 20a, 20n will cause their identities to be written to the TCB data structure 30 at fields 30a and 30b, respectively. Once the work of the application 40 is done (i.e., all requests sent and "Done" messages received back from the enlisted resources such as DP1 and DP2), the application 40 will, at step 74, make an End Transaction call to cause the beginner TMF component 24C to, at step 76, initiate the 2PC protocol to either fix (make persistent) the change effected to the database managed by the system 10 or to abort.

Assume now that some collateral activity is needed to verify the requested change to the state of the database. Normally, this collateral activity would then be called by the application 40 after the transaction has proceeded through the 2PC protocol and the change is made. If that verification indicates that the change violates certain policy rules, it must be undone. To obviate that situation, the present invention is provided.

According to the present invention, an application programming interface (API) 50 (shown in FIG. 1 as residing on CPU 12b) is provided to implement one or more predetermined policy rules. API 50 is an application specific process, called within the context of the particular transaction started by the application 40. Thus, with the requests RQST-1 and RQST-2 sent to the disk processes DP1 and DP2, respectively, to enlist their services in the transaction (step 68), the application 40 will also make a request (RQST-3) of the API 50. When the request is made, the application 40 will supply the particulars that are to be measured against the policy rules and verified or not verified. However, the API 50 needs voting participating in the transaction so that it can abort the transaction if a particular policy rules it is verifying are violated. Accordingly, in step 70, the API 50 is structured to make a call (TMF_EXPORT) to its local TMF component 24b, supplying the identity of the caller, API 50, and the identification of the transaction (supplied the API 50 by the application 40).

The TMF_EXPORT call operates to "register" the API 50 with the transaction by messaging the beginner TMF component 24C to write the identification of the API 50 to the TCB data structure 30 corresponding to the transaction. Thereby, API 50 is registered as a participant in the transaction. Thus, the TCB data structure 30 will now contain the identities of the participants of the transaction as disk processes 20a, 20n at fields 30a, 30b, and API 50 at field 30c.

When the application 40 has completed its work, it will call End Transaction as before (step 74). This will cause the TMF component 24 on the beginner CPU 12c to initiate the 2PC protocol (step 76) by broadcasting "Prepare" signals to all CPUs 12. Those CPUs 12 having transaction participants, i.e., the CPUs 12a (disk process 20a), 12b (API 50), and 12n (disk process 20n), will through their respective TMF components 24, will notify the participants. Thus, when the API 50, since it is now a participant, receives the Prepare signal, it will perform its specified function to verify, if that is its function, the consistency of the change according to predetermined policy rules. If that verification finds that the change to the state of the database is consistent with those policy rules, the API 50 will reply to the inner TMF component 24 of the beginner CPU 12c a Ready signal, as will the disk processes 20, if they have not encountered any faults and are prepared to make the change persistent. The TMF component 24 of the beginner CPU 12c can then commit the change as described above.

If, on the other hand, the verification or other collateral activity performed by the API 50 indicates that the requested change violates some predetermined rule, the API 50 will return an Abort signal to the TMF component 24 on the beginner CPU 12c, causing the TMF component 24 to abort the transaction, and roll back the change in conventional fashion so that it is not effected.

The specific embodiments detailed herein are by way of example and not limitation. Also, modifications and substitutions will be readily apparent to one of ordinary skill in the art on reading the background and invention description above. For example while those resources or processes directly involved in a transaction to change the state of an information collection, such as the disk processes DP1 and DP2, are usually "recoverable," those resources or processes not involved in that change of state, i.e., collateral activity such as provided by API 50, need not be recoverable and can, in fact be "volatile." A volatile resource is one for which no recovery is necessary after the system crashes, as is necessary (and conventional) for recoverable resources. Thus, there is no need to keep a record of a volatile resource after a commit signal is sent by a beginner TMF component—as is done for recoverable resources. Accordingly, the scope of the invention is to be determined by the metes and bounds of the claims which follow.

What is claimed is:

1. In a transaction processing system, a method for incorporating a concurrent collateral process in a transaction for which one or more resources are enlisted as participants, comprising:

initiating the transaction;

calling a collateral process for concurrently implementing policy rules in relation to the transaction;

registering the collateral process as an additional participant in the transaction, the called collateral process prompting its registration by means of an application programming interface (API) call that functions to register that collateral process with the transaction;

initiating an end stage of the transaction;

sending a prepare signal to all participants including the collateral process when the end stage is reached so as to prompt the collateral process to vote based on the policy rules implementation;

receiving from the collateral process a ready signal if the collateral process is completed successfully; and receiving an abort signal from the collateral process if the collateral process does not complete successfully or a violation of the policy rules is detected.

2. The method of claim 1, wherein the transaction is instantiated by a prompt from an application, the collateral process being specific to the application and called thereby to implement the policy rules.

3. The method of claim 1, wherein the API call includes an identity of the transaction and an identity of the collateral process.

4. The method of claim 1, wherein, if the ready signal is received, the method further comprises:

writing a commit record to a log;

sending a commit signal to the collateral process; and replying to the commit signal with a forgotten signal from the collateral process.

5. The method of claim 1, wherein the transaction involves a change, and if the abort signal is received the change is undone before the change is made persistent.

6. The method of claim 1, wherein the transaction initiation includes forming a data structure with information for controlling and tracking the transaction.

7. The method of claim 1, wherein the transaction involves a change, and if the ready signal is received the change is made persistent during the end stage.

8. The method of claim 1, wherein the collateral process is performed in parallel with the transaction.

9. A method in a transaction processing system for enabling a collateral process to concurrently participate in a transaction for which one or more resources are enlisted as participating subordinates, the transaction processing system having a distributed transaction monitoring facility (TMF) with a component thereof resident in each of its plurality of processors, the method comprising;

initiating the transaction on a beginner processor from the plurality of processors;

registering a collateral process as an additional participating subordinate of the transaction, the collateral process being called to concurrently implement policy rules in relation to the transaction, the collateral process prompting its registration by means of an application programming interface (API) call that functions to register the calling collateral process with the transaction;

sending a prepare signal from the TMF component resident in the beginner processor to all participating subordinates including each registered collateral process when an end stage of the transaction is reached;

receiving a ready signal from each registered collateral process if it completes successfully; and receiving an abort signal from each registered collateral process if it does not complete successfully or a violation of policy rules is detected.

10. The method of claim 9, wherein, if the ready signal is received by the TMF component in the beginner processor, the method further comprises:

writing a commit record to a log;

sending a commit signal to each registered collateral process; and receiving, in reply to the commit signal, a forgotten signal from each registered collateral process.

11. A transaction processing system for enabling a collateral process to concurrently participate in a transaction for which one or more resources are enlisted as participating subordinates, comprising:

a plurality of processors any one of which being designated a beginner processor when it initiates the transaction;

a distributed transaction monitoring facility (TMF) with a component thereof resident in each of the plurality of processors; and an application programming interface (API) a call to which functions to register with the TMF one or more collateral processes as additional participating subordinates of the transaction in view of such collateral processes being called, wherein each TMF component is configured to, if resident in one of the plurality of processors designated relative to the transaction as the beginner processor, send a prepare signal to all participating subordinates including each registered collateral process when an end stage of the transaction is reached, receive a ready signal from each registered collateral process if it completes successfully, and receive an abort signal from each registered collateral process if it does not complete successfully or a violation is detected.

\* \* \* \* \*